Oct. 18, 1932.　　T. H. STRACHAN　　1,883,077
SCALE
Filed Dec. 2, 1930　　2 Sheets-Sheet 1

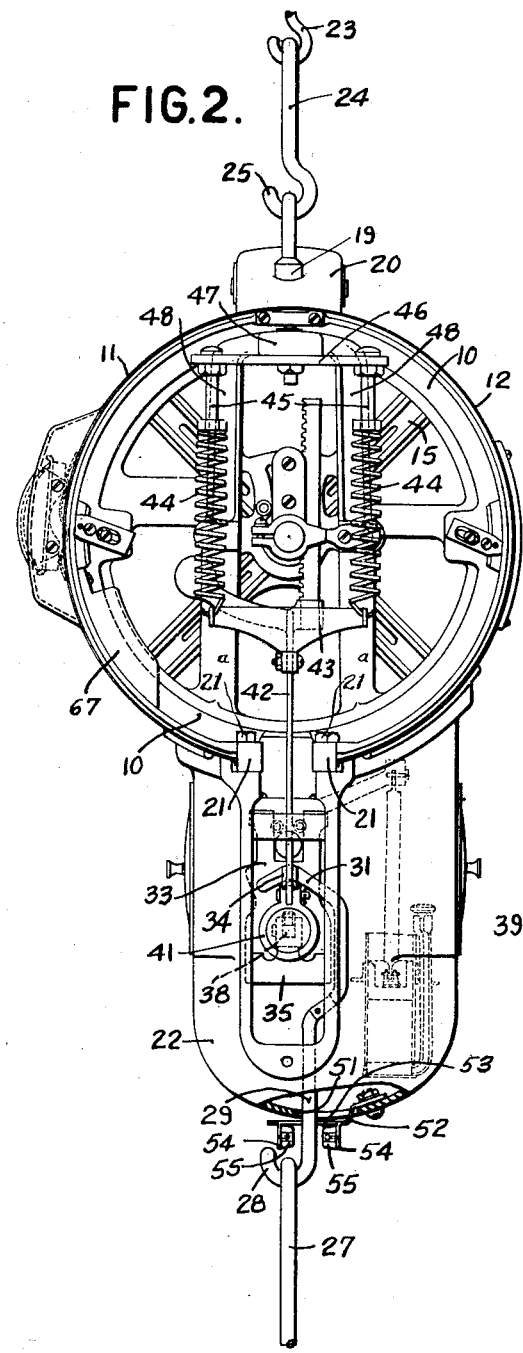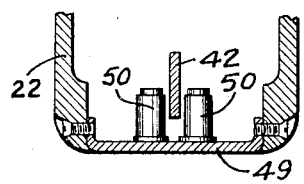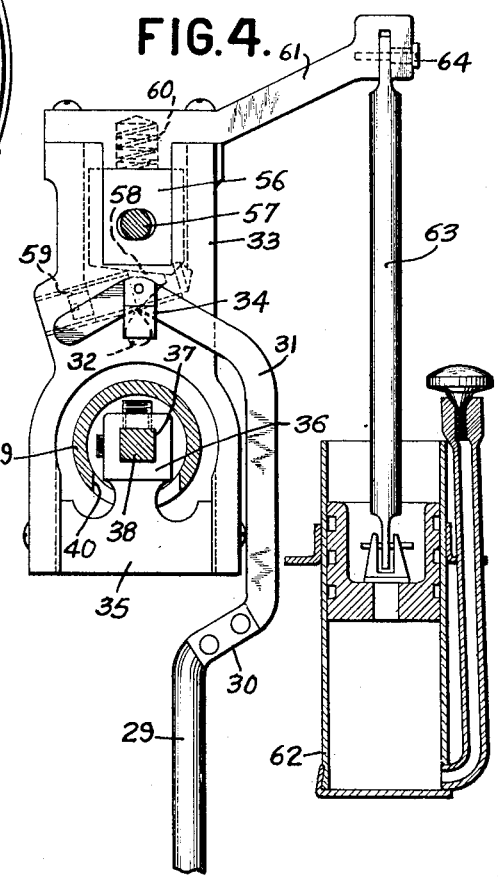

Patented Oct. 18, 1932

1,883,077

UNITED STATES PATENT OFFICE

THOMAS H. STRACHAN, OF DAYTON, OHIO, ASSIGNOR TO DAYTON SCALE COMPANY, OF DAYTON, OHIO, A CORPORATION OF NEW JERSEY

SCALE

Application filed December 2, 1930. Serial No. 499,448.

The present invention relates to weighing scales and particularly that type of scale which is suspended as a unit from a hook or other support and hangs freely therefrom.

The main object of this invention is to provide a greatly improved scale of the type described which is accurate and efficient in its performance, cheap to manufacture, and requires few adjustments to render it accurate.

A more specific object is to provide a novel arrangement of parts for suspending a scale of the above type from its support.

A further object is to provide improved means for preventing or reducing to a minimum undesirable swinging to and fro of the actuating mechanism for the drum chart or other means for indicating weight.

Another object is to provide novel means for compensating unbalanced forces due to the weight of unsymmetrically arranged parts of the weighing mechanism or the housing therefor whereby the scale as a unit is kept with its axis of symmetry vertical.

A still further object is to provide a novel and improved arrangement of parts for increasing the accuracy of the weighing mechanism by reducing the effects of friction to a minimum, increasing the accuracy of the springs, and providing novel means for setting the chart to read zero when no load is on the scale.

Another object is to provide an improved arrangement comprising a plurality of pairs of springs for counterbalancing loads carried by the load support.

Various objects, advantages, and features of the present invention will be particularly pointed out in the following specification and claims or will be clear from a study thereof and of the accompanying drawings.

In said drawings:

Fig. 2 is a right side elevation of the scale illustrated in Fig. 1 with the right end plate of the cabinet removed.

Fig. 3 is a horizontal section taken substantially on the line 3—3 of Fig. 1 and is a detail view of the means for keeping certain movable parts from swinging.

Fig. 4 is an enlarged section through the drum chart actuating mechanism and related parts, the section being taken substantially on the line 4—4 of Fig. 1.

Figure 1:
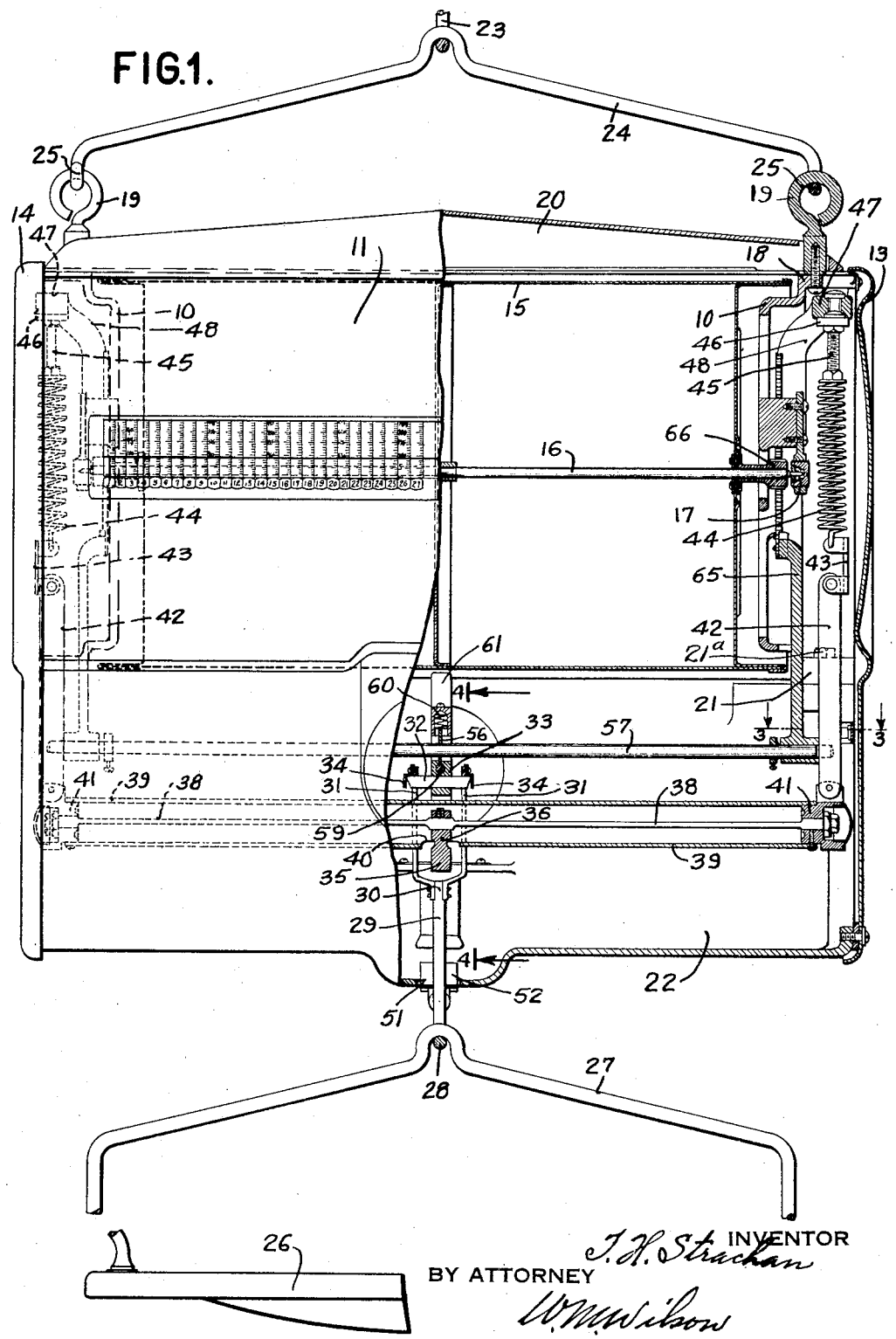
Fig. 1 is a front elevation of a scale embodying the improvements of the present invention, the right hand half of the scale being shown as a vertical section taken through the axis of the shaft supporting the drum chart.

The scale mechanism is carried by two end frames 10 which are substantially circular in shape and to which are rigidly attached the front and rear halves 11, 12, respectively, of the drum casing. The two halves 11, 12 of the drum casing are substantially semi-cylindrical in shape and with the right and left end casings 13, 14 respectively, act as a housing for the drum chart 15 which is rigidly mounted on a shaft 16 carried by suitable anti-friction bearings or pivots 17 mounted in the end frames 10. The end frames 10 are each provided with an offset lug 18 to which is rigidly attached an eye 19, the said eyes passing through large holes in the top cover 20 of the drum chart housing. The end frames 10 are preferably cast with a pair of bosses or lugs 21 from which is rigidly suspended the lower housing 22 containing the actuating mechanism for the drum chart, the lower housing being attached to the lugs 21 by means of screws 21a passing through suitable holes in lugs 21.

It will be seen that the entire assembly comprising the end frames 10, the front and rear halves of the drum casing 11, 12, the end plates 13, 14, the top cover 20, and the lower housing 22 form an integral unit which is suspended from a suitable hook or support 23 by novel means including a bail 24 pivotally connected to the eyes 19 as by means of suitable hooks 25 formed in said bail.

The load support such as a scale pan 26 is suspended from the actuating mechanism for the chart drum and the draft bar by means comprising a bail 27 fastened to the scale pan 26 and hanging on a hook 28 which in turn is hung from the actuating mechanism. The hook 28 has a straight portion 29 and a portion 30, bent at an angle to said straight portion, to which is rigidly attached two pivot elements 31. Each of the pivot elements 31 is shaped like a goose-neck at its upper end and has a sharp bend cooperating with the knife edge of a pivot element 32 carried by an element 33, the pivot elements 31 resting upon said knife edges. An overhanging plate 34 attached to each pivot element 31 adjacent the pivot element 32 depends downwardly and abuts the end of the pivot element 32 thereby preventing said pivot elements 31 from slipping off the pivot element 32 in an axial direction.

The element 33 serves to connect the draft bar and equalizer bar as well as to operate the dash pot in a manner about to be described. Fig. 4 gives an enlarged view of the element 33 and its related mechanism and it will be observed that the lower portion thereof is bifurcated to support a member 35 shaped like an inverted T, the member 35 being joined by means of screws or the like to the element 33. The vertically extending portion 36 of the member 35 is provided with a square opening 37 into which fits the squared part of a cross bar 38, suitable set screws serving to prevent axial movement of bar 38 relative to member 35.

The bar 38 forms part of the thermostatic draft bar, the other part of the draft bar being composed of a tube 39 having an opening 40 to accommodate the member 35 and closed at both ends by members 41 to which the bar 38 is fastened by means of suitable adjusting nuts. The squared portion of bar 38 is at the mid-point of said bar, consequently a downward pull upon the member 33 will be communicated equally to links 42 pivoted to lugs formed in members 41. The links 42 are pivoted to the mid points of equalizer bars 43, the outer ends of the equalizer bars 43 being in turn pivoted to the springs 44.

One of the novel features of this invention is the provision of two springs 44 at each end of the scale which are suspended by means of adjustable bolts 45 from cross bars 46, each cross bar 46 being supported by a lug 47 extending laterally from an upstanding arm 48 forming part of the end frames 10, the arms 48 extending upwardly and outwardly from points near the centers of the end frames 10. It has been found in practice that the use at both ends of the scale of two springs instead of one greatly improves the accuracy of the scale and permits a finer adjustment for accuracy.

Novel means has been provided for checking movement of the connecting links 42 and the parts connected thereto in a direction transverse to the drum chart shaft. A bar 49 is mounted in each end of the lower housing 22 adjacent one of the links 42 and is provided with two anti-friction rollers 50, one on each side of the associated link 42, just sufficient clearance being provided between said rollers to permit links 42 to move longitudinally substantially without friction.

There is also provided novel means for reducing to a minimum shocks received by the lower housing 22 during weighing operations when the hook 28 sometimes swings forwardly and rearwardly in a manner to bump the edges of the opening in said housing through which passes the straight portion of the hook 28. Attached to the housing 22 adjacent the hole 51 through which the hook 28 passes is a member 52 having an opening 53 formed by bending two tongues or lugs 54 at right angles to said member 52. The tongues 54 have attached thereto suitable buffers or cushions 55 of resilient material, there being a cushion disposed on both the front and rear sides of the straight portion 29 of hook 28. The buffers 55 have sufficient clearance to permit free longitudinal movement of the hook 28 and serve to absorb shocks due to sudden transverse movements.

The element 33 is bifurcated at its upper end and has slidably mounted therein a plate 56 having an oval hole through which passes the equalizer rod 57. The plate 56 slides vertically in grooves formed in the bifurcation and has its lower edge 58 forming an obtuse angle with the guiding groove. A set screw 59 screwed into an inclined hole formed in the element 33 has a conical point engaging the edge 58 so that the plate 56 may be adjusted vertically by simply turning the screw so as to force it further into its hole thereby wedging the plate 56 upwardly against the pressure of a strong compression spring 60 which is contained in a hole in an arm 61 attached to both of the arms of the bifurcation in element 33, the arm 61 being slotted to permit the plate 56 to move upwardly against the pressure of the spring. This construction permits adjustment of the distance of the equalizer bar 57 from the center of bar 38 and is for the purpose of setting the drum chart to read zero. Mounted upon the housing 22 in the rear of the element 33 is a dash pot 62 the piston rod 63 of which is pivotally connected to the arm 61 at 64, the arm 61 extending for this purpose upwardly and transversely of the rod 57. Pivotally connected to each end of the equalizer rod 57 is a rack bar 65 the teeth of which mesh with a pinion 66 rigidly mounted upon the shaft 16 carrying the drum chart.

It will be noted from an inspection of Figs. 1 and 2 that the scale has been so constructed as to be nearly symmetrical with respect to a vertical line passing through the center of the supporting hook 23 and the scale pan 26. The housing 22 is not quite symmetrical near the center thereof owing to the fact that it is somewhat unsymmetrically enlarged in the neighborhood of the element 33 in order to accommodate said element and the dash pot and, since the dash pot is necessarily mounted to one side of said element, the vertical axis of symmetry of the enlargement is somewhat to the rear of the vertical axis of symmetry of the remainder of said housing which latter axis corresponds to the vertical axis of symmetry of the drum chart housing.

In order to locate the center of gravity of the scale as a whole on the vertical line passing through the center of the support 23 and the center of the scale pan 26 there is provided novel means for counterbalancing the weight of the dash pot and unsymmetrical parts of the housing comprising weights 67, fastened to the end ring 10 at each end of the scale and on the opposite side of the axis of the shaft 16 of the side in which the dash pot is located referred to a vertical plane passing through the axis of said shaft. The weights 67 constitute one of the novel features of the present invention and in practice will be so proportioned in value as to just counterbalance the weight of the dash pot and the unbalanced weight of casing 22 so that the scale will hang with its axis of symmetry vertical as in Fig. 2.

The present invention, for sake of convenience in description and to assist in a clear understanding of the principles involved, has been shown as applied in a specific form, however, it is not desired to limit the invention to the precise form of embodiment shown and described as it is capable of being used in various forms, all falling within the scope of the claims which follow:

1. In a hanging drum scale the combination of a frame, a cylinder chart carried thereby, an actuating member for said chart extending axially of the chart, a dash pot carried by said frame, and means rigid with said actuating member and extending transversely of the member for operating the dash pot.

2. In a hanging type scale, a chart, an upper housing for said chart, actuating means for said chart, a lower housing for the actuating means rigid with and depending from the upper housing and solely supported by the latter, a dash pot carried by the lower housing, and means operated by the chart actuating means for operating the dash pot.

3. In a scale the combination of a suspended drum chart housing symmetrical about a vertical axis passing through its point of suspension, a lower housing asymmetrical with respect to said vertical axis and depending from said drum chart housing, and means for compensating for the weight of the asymmetrical portion of said housing.

4. In a scale, a suspended drum chart housing comprising a pair of end frames and casing members integral with said frames, said housing being substantially symmetrical with respect to a vertical axis passing through its point of support; a lower housing integral with said drum chart housing and depending therefrom, said lower housing having a portion symmetrical with respect to said vertical axis and an enlarged portion asymmetrical with respect to said vertical axis; dash pot mechanism housed in said enlarged portion and supported thereby at a point outside of said vertical axis; and means comprising a pair of weights, each carried by one of said end frames for compensating for the overbalancing effect on the housing due to said dash pot and the unsymmetrical portion of said lower housing.

5. A scale comprising a housing substantially symmetrical about a vertical axis, means for suspending the housing, weighing mechanism within the housing disposed to overbalance the housing in one direction to thereby incline its axis of symmetry away from the vertical, and a weight secured to said housing to counteract the tendency of the weighing mechanism to overbalance the housing in one direction whereby the scale housing is suspended with its axis of symmetry in a vertical line.

6. In a drum scale, a drum chart, a draft bar extending axially of the chart, a load support connected to the draft bar, actuating connections between the draft bar and the chart, a pair of load counterbalancing springs at each end of the drum chart, connections from each end of the draft bar to the adjacent springs, and means for equalizing the pull of the draft bar on each pair of springs.

7. In a drum scale, a drum chart, a draft bar extending axially thereof, actuating connections between the bar and the chart, a load support, an element having a knife edge and carried by the draft bar at substantially the center thereof, and a connection between the load support and the draft bar suspended from said knife edge.

8. In a scale the combination of a housing, weighing mechanism supported within said housing comprising a drum chart and actuating mechanism therefor disposed axially of said chart, a load support, an element connecting the load support with the actuating mechanism and extending through an opening in said housing, and means for absorbing shocks due to swinging motion of the element and the load support comprising a member mounted in said housing adjacent the opening therein and having resilient cushions disposed on opposite sides of said element.

9. In a scale, indicating mechanism, operating devices therefor including a vertical link capable of horizontal movement, a frame, and means carried thereby for engaging opposite sides of the link to limit its horizontal movement, said means comprising anti-friction elements freely rotatably engageable with the sides of the link.

10. In a scale the combination of suspended housing having a portion thereof symmetrical about a vertical axis passing through the point of suspension and another portion asymmetrical with respect to said vertical axis and depending from the first named portion, and means for compensating for the weight of the asymmetrical portion of the housing.

11. In a scale, an indicator, a load support, connections between said indicator and said support, including equalizer means, and a plurality of counter balance members operatively connected to each end of the equalizer means and to which the load is equally distributed.

12. In a scale, a suspended housing substantially symmetrical about a vertical axis, weighing mechanism within the housing disposed to overbalance the housing in one direction to thereby incline the axis of symmetry away from the vertical, and means removably and interchangeably secured to said housing for counteracting the tendency of the weighing mechanism to overbalance the housing whereby to hold the housing with its axis of symmetry in a vertical line.

13. In a scale, indicating mechanism, operating devices therefor including a vertical link capable of horizontal movement, a detachable end frame for the scale, and means carried by the end frame for engaging opposite sides of the link to limit horizontal movement of the latter.

14. In a scale, a housing, weighing mechanism in said housing, said mechanism being movable in response to a load and capable of movement relative to the housing and laterally of the direction of movement of the weighing mechanism in response to the load, and resilient means for limiting lateral movement of the weighing mechanism.

15. In combination with weighing mechanism including a load support, load counterbalancing means, and means connecting the load support with the counterbalancing means, said connecting means being capable of lateral movement, yielding means for limiting lateral movement of the connecting means whereby to prevent excessive lateral movement of the connecting means.

16. In combination with weighing mechanism including a load support, load counterbalancing means, and means connecting the load support with the counterbalancing means, said connecting means being capable of movement lateral of movements in response to the load, yielding means for limiting lateral movement of the connecting means whereby to prevent excessive lateral movement of the connecting means, said yielding means comprising a plurality of elements on opposite sides of the connecting means to individually resist lateral movement of said connecting means in opposite directions.

17. In a scale, a frame, weighing mechanism, a load support, a connection between said mechanism and said load support, said connection being adapted to move vertically under the influence of a load on the support to actuate the weighing mechanism and also to move horizontally relative to the frame, and shock absorbing means carried by the frame for flexibly opposing horizontal movement of said connection.

In testimony whereof I hereto affix my signature.

THOMAS H. STRACHAN.